April 12, 1938. R. J. GUBA 2,114,181
CONVEYER BELT
Filed March 3, 1937
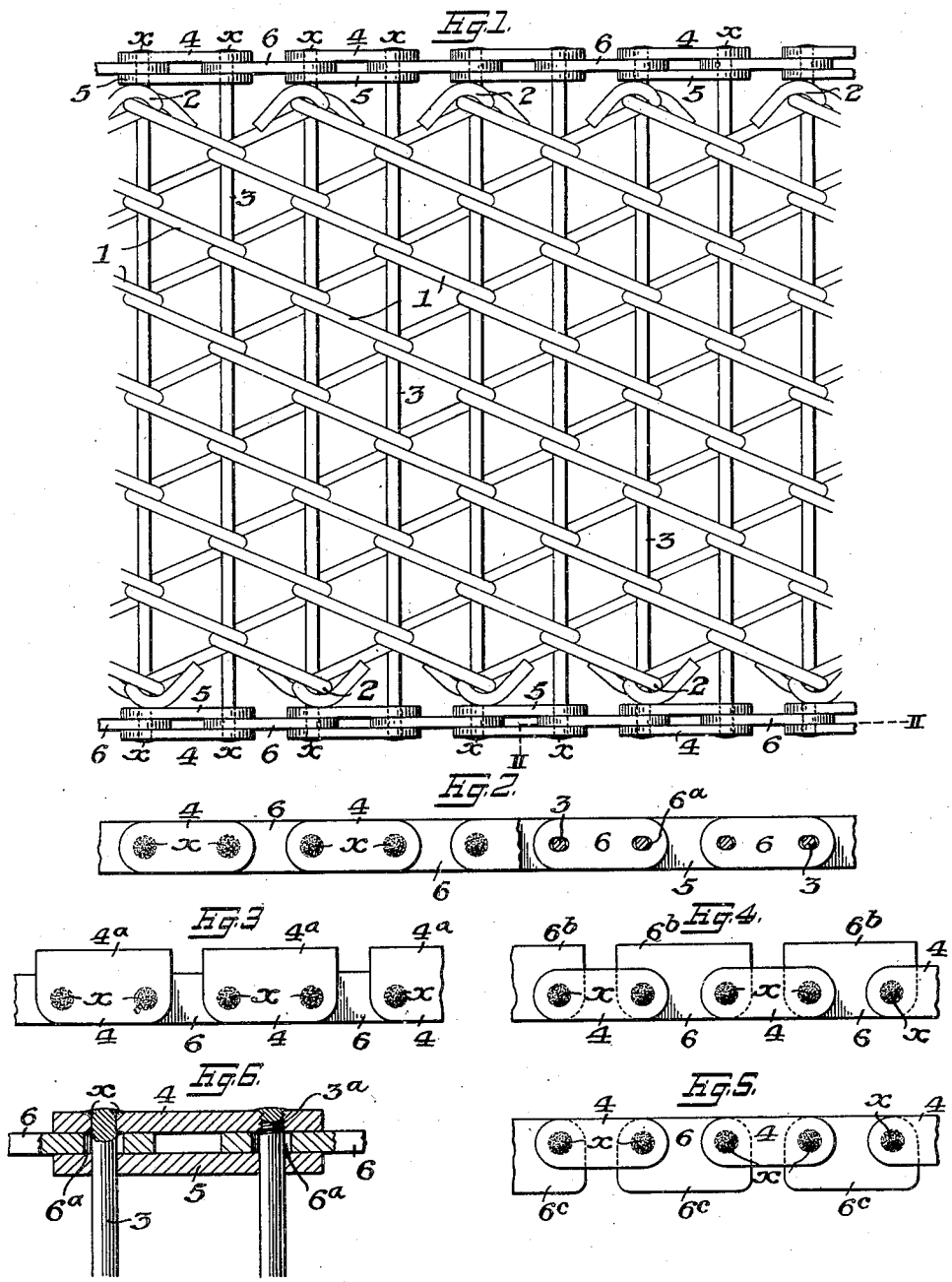
Inventor:
R. J. Guba,
by Murray C. Boyce
Atty.

Patented Apr. 12, 1938

2,114,181

UNITED STATES PATENT OFFICE 2,114,181

CONVEYER BELT

Raymond J. Guba, Philadelphia, Pa., assignor to Audubon Wire Cloth Corporation, Philadelphia, Pa., a corporation of New Jersey Application March 3, 1937, Serial No. 128,865

3 Claims. (Cl. 198—194)

My invention relates to conveyer belt structures and one object of my invention is to provide a continuous belt or apron made up of helically coiled wires, which may be in interconnected relation, associated with cross bars or rods whose ends are permanently attached to a series of connecting members which may be in the form of links and which constitute permanent selvages. The rods are connected in pairs and the connecting members are in transverse alignment.

A further object of my invention is to provide complete, unitary structure that may be employed as a belt or conveyer for various objects under all conveying necessities.

A further object of my invention is to provide the connecting members constituting the edge-forming or selvage linkage with extensions, above or below the plane of the belt; such extensions when arranged below the plane of the belt serving as wear elements.

A further object of my invention is to provide a structure wherein one set of members of the connecting linkage are slotted so as to permit the helical wires of the belt to settle into their final position longitudinally of the belt without danger of distortion.

These and other features of my invention are more fully described hereinafter; reference being had to the accompanying drawing, more or less diagrammatic in character, in which:

Figure 1 is a plan view of a portion of a belt structure within the scope of my invention.

Fig. 2 is an edge view or side elevation of the same, partly in section on the line II—II, Fig. 1.

Figs. 3, 4, and 5 are modified forms of connecting linkage to which the ends of the cross bars or rods may be connected, and Fig. 6 is an enlarged sectional view illustrating in detail the manner in which the cross bars or rods may be permanently connected to the marginal links or selvage forming members.

In Fig. 1 of the drawing, I have illustrated a portion of a belt structure sufficient to disclose the features forming the subject of my present invention. In this view a series of helically coiled wires are indicated at 1; pairs of said wires having their ends knuckled together as indicated at 2.

In the present instance, I have shown a series of cross rods 3 passing through the successive bights of the interconnected helically coiled wires, and successive pairs of these cross rods are permanently attached at their ends to connecting members or links indicated at 4. In addition to the connecting members or links 4, I provide connectors or links 5 which are loose on the rods 3 and which may lie adjacent to the knuckled connections 2 of the helically coiled wires; said loose links 5 being disposed opposite the links 4. Between the links 4 and 5, other connectors or links 6 may be disposed which connect the rods of each pair whose ends are joined to the members 4, and these links 6 have elongated apertures 6a through which the rods 3 pass. The bights of the helically coiled wires when initially engaged do not set up close against the cross rods 3 and some stretch is imparted to the belt when it is in use, especially at the commencement thereof. In order that this stretch may be compensated for the apertures of the intermediate links 6 are elongated in the form of slots to permit such stretch to be taken up.

The ends of the cross rods or bars are permanently attached to the links 4, and this connection may be effected by welding the ends of the bars to the links as indicated at $x$. The enlarged view, Fig. 6, shows the manner of attaching the bars or rods 3 to the links 4. In addition it shows the slots 6a provided in the links 6 to compensate for stretch of the helically coiled wires 1 making up the supporting portion of the belt structure.

If desired, certain of the links may have portions extending above or below the plane of the other links and the helically coiled wires, and forms of such extensions are shown in Figs. 3, 4, and 5. In Fig. 3 I have shown the links or rod connections 4 as having extensions 4a, disposed above the plane of the other links or connecting members. In Fig. 4 I have shown the links 6 as having extensions 6b disposed above the plane of the other links or connecting members. In both instances these extensions form guards to prevent articles carried by the belt moving off the same. In Fig. 5 I have shown the links 6 as having extensions 6c depending from the same; such extensions providing wear surfaces. It will be understood of course, that the extensions of the connecting members, whether arranged above or below the plane of the belt, may be carried by any set of the links or connecting members.

While I prefer to weld the ends of the cross rods or bars to the connecting members or links, it is possible to provide other forms of connections and in Fig. 6 I have shown an end of one of the rods or bars threaded at 3a for engagement with a threaded aperture in the member 4; the outer end of the rod or bar being subsequently upset or riveted to secure the parts in permanent relation. To facilitate engagement of threaded bars or rods one end of the same may have a right hand thread and the opposite end a left hand thread so that engagement with the connecting members or links at both ends of such bar or rod may take place simultaneously.

I do not wish to be limited to the exact type of connecting member or link to form the permanent selvages, and while it is preferable to dispose the members 6 between the members 4 and 5, the members 6 may lie inside the members 5 and between the same and the knuckled connections of the helically coiled wires; the members 4 and 5 in such arrangement being directly adjacent each other.

By my construction I have provided a complete unitary structure with permanent selvages in fixed position. In use the belt passes over driving and driven drums or rollers, the selvage linkage performing no function of driving in the movement of the belt.

While I have shown a series of helically coiled wires with the helices extending in one direction, it will be understood of course that wires having helices extending in the opposite direction may be employed without departing from my invention. In the present instance, the helically coiled wires are shown in interconnected relation, with the rods or bars passing through the interconnected bights, but it is within the scope of my invention to employ helically coiled wires which engage pairs of the bars only and which are not interconnected, and in such form of structure I may employ helically coiled wires of right hand twist alternating with helically coiled wires of left hand twist, if desired.

It is to be understood, of course, that modifications may be made in the construction and arrangement of the several elements making up my improved conveyer belt structures, without departing from the spirit of my invention; all of which is deemed to be within the scope of the appended claims.

I claim:

1. A belt structure comprising cross rods arranged in spaced relation, a plurality of sets of connecting members carried by the ends of pairs of said rods; the outer connecting members of each set being permanently secured to the ends of pairs of said rods and the inner members being loosely mounted on said rods, helically coiled wires extending transversely between said inner connecting members and having their bights engaged by said rods; each of said helically coiled wires being interlooped with an adjacent helically coiled wire and engaging a pair of said cross-rods, and links connecting pairs of said cross-rods and lying between the fixed and loose connecting members at the ends of the same.

2. A belt structure comprising cross rods arranged in spaced relation, pairs of connecting members in spaced relation carried by the ends of pairs of said rods; the outermost of said connecting members being permanently secured to said rods and the innermost being loose thereon, slotted links mounted on said rods and lying between the fixed and loose connecting members at the ends of said cross rods alternately connecting the pairs of rods whose ends are joined, and helically coiled wires extending transversely between said connecting members and having their bights engaged by said rods; each of said helically coiled wires being interlooped with an adjacent helically coiled wire and engaging a pair of said cross-rods.

3. A belt structure comprising cross rods arranged in spaced relation, a plurality of sets of connecting members carried by the ends of said rods; the outer connecting members being permanently secured to the ends of pairs of said rods and the inner connecting members being loosely mounted on said rods; certain of said connecting members having extensions projecting beyond the plane of the belt, links connecting pairs of said cross-rods with their ends lying between the end portions of the connecting members at the ends of pairs of said rods, and helically coiled wires extending transversely between said inner connecting members and having their bights engaged by said rods; each of said helically coiled wires being interlooped with an adjacent wire and engaging a pair of said cross rods.

RAYMOND J. GUBA.